United States Patent
Chapman et al.

(10) Patent No.: US 11,874,932 B2
(45) Date of Patent: Jan. 16, 2024

(54) MANAGING APPLICATION SECURITY VULNERABILITIES

(71) Applicant: International Business Machines Corporation, Armonk, NY (US)

(72) Inventors: Matthew Paul Chapman, Eastleigh (GB); Chengxuan Xing, Romsey (GB); Ashley Donald Harrison, Southampton (GB); Vlad Balanescu, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 2 days.

(21) Appl. No.: 17/305,057

(22) Filed: Jun. 30, 2021

(65) Prior Publication Data

US 2023/0004650 A1    Jan. 5, 2023

(51) Int. Cl.
*G06F 21/57* (2013.01)
*G06F 21/54* (2013.01)

(52) U.S. Cl.
CPC .......... *G06F 21/577* (2013.01); *G06F 21/54* (2013.01); *G06F 2221/033* (2013.01)

(58) Field of Classification Search
CPC ... G06F 21/577; G06F 21/54; G06F 2221/033
See application file for complete search history.

(56) References Cited

U.S. PATENT DOCUMENTS

| 8,732,839 B2 | 5/2014 | Hohl |
| 9,558,355 B2 | 1/2017 | Madou |

(Continued)

FOREIGN PATENT DOCUMENTS

| CN | 111191243 A | 5/2020 |
| WO | 2020168194 A1 | 8/2020 |

OTHER PUBLICATIONS

Mell et al., "The NIST Definition of Cloud Computing", NIST, National Institute of Standards and Technology, Special Publication 800-145, Sep. 2011, 7 pages.

(Continued)

*Primary Examiner* — Trong H Nguyen
(74) *Attorney, Agent, or Firm* — Stephen R. Yoder; Jared Montanaro (57) ABSTRACT

Approaches presented herein enable a security risk manager embedded in an application to manage security vulnerabilities of the application. More specifically, the application comprises code entities such as components, packages, libraries, or microservices. The entities are modified as part of the application development process to have an enabled state, in which these entities are permitted to run normally when called, and a disabled state, in which these entities do not run when called but instead perform a back-out behavior such as generating an error message. At runtime, the application periodically accesses a security vulnerabilities database to check for security alerts. When a relevant security alert is found, the application changes any code entities that are affected by the security alert to the disabled state pending investigation by an operations team. The application notifies the operations team by sending a notification of the security alert to an external security monitoring tool.

20 Claims, 5 Drawing Sheets

(56) References Cited

U.S. PATENT DOCUMENTS

| | | | |
|---|---|---|---|
| 10,169,585 B1 | 1/2019 | Pilipenko | |
| 10,242,200 B1 | 3/2019 | Young | |
| 10,313,383 B2 | 6/2019 | Sommer | |
| 2006/0161582 A1* | 7/2006 | Aghajanyan | G06F 21/53 |
| 2006/0230441 A2* | 10/2006 | Oliphant | H04L 63/1433 |
| | | | 726/11 |
| 2008/0127334 A1* | 5/2008 | Gassoway | G06F 21/57 |
| | | | 726/22 |
| 2015/0113654 A1* | 4/2015 | Lymer | G06F 21/51 |
| | | | 726/25 |
| 2016/0127367 A1* | 5/2016 | Jevans | H04L 63/123 |
| | | | 713/152 |
| 2018/0107826 A1* | 4/2018 | Ellis | G06F 21/53 |
| 2018/0316711 A1 | 11/2018 | Iyer | |
| 2019/0306173 A1* | 10/2019 | Reddy | G06F 11/3604 |
| 2021/0157905 A1* | 5/2021 | Musseau | G06F 9/442 |
| 2021/0160272 A1* | 5/2021 | Mehandale | H04L 63/1416 |
| 2022/0156383 A1* | 5/2022 | Schwarzbauer | G06F 21/6245 |
| 2022/0329630 A1* | 10/2022 | Li | H04L 63/20 |
| 2022/0360601 A1* | 11/2022 | Rose | H04L 45/74 |

OTHER PUBLICATIONS

International Search Report and Written Opinion, International Application No. PCT/IB2022/055700, International Filing dated Jun. 20, 2022.

* cited by examiner

MANAGING APPLICATION SECURITY VULNERABILITIES

TECHNICAL FIELD

The present invention relates generally to managing security vulnerabilities in computer applications and, more specifically, to embedding a security risk manager in an application to manage security vulnerabilities of the application.

BACKGROUND

Security vulnerabilities are typically screened for with reference to one or more security vulnerability databases. For example, there are numerous commercially available software tools for web applications that operate in this way. The National Institute of Standards and Technology (NIST) National Vulnerability Database (NVD) is perhaps the most extensively used security vulnerability database. This is a publicly available database. Other security vulnerability databases have been created and are maintained by commercial providers.

If a security vulnerability is discovered for a sensitive application, such as a financial application performing bank transactions or a medical app handling confidential patient data, it is necessary for an operations team responsible for managing the security of the application to investigate the security vulnerability and take any remedial action that is necessary. For the period of time between a security vulnerability becoming known to the operations team, and the vulnerability having been investigated and dealt with, the operations team must decide whether to take the application offline pending investigation or to allow the application to continue running. The former approach results in loss of service, whereas the latter approach continues to leave the application exposed to the security vulnerability.

SUMMARY

Approaches presented herein enable a security risk manager embedded in an application to manage security vulnerabilities of the application. More specifically, the application comprises code entities such as components, packages, libraries or microservices. The code entities are modified as part of the application development process to have an enabled state, in which they are permitted to run normally when called, and a disabled state, in which the code entity does not run when called but instead performs a back-out behavior such as generating an error message. At runtime, the application periodically accesses a security vulnerabilities database to check for security alerts. When a relevant security alert is found, the application changes any code entities that are affected by the security alert to the disabled state pending investigation by an operations team. The application notifies the operations team by sending a notification of the security alert to an external security monitoring tool.

According to one aspect of the disclosure, there is provided a computer automated method for an application, the method comprising: providing each of a plurality of code entities of the application with an enabled state in which the code entity is permitted to run responsive to being called and a disabled state in which the code entity is prevented from being run responsive to being called and instead performs a back-out behavior, and providing the application with a security risk manager operable to: access a security vulnerabilities database to check for security alerts relevant to said plurality of code entities; and, responsive to finding a relevant security alert, automatically change any of said plurality of code entities that are affected by the security alert to the disabled state.

The security risk manager is designed to be used at runtime to mitigate security vulnerability risk in a live application during the period of time between a security vulnerability becoming known and the security vulnerability having been investigated and dealt with. The security risk manager allows an automatic and immediate response to be taken as soon as a new vulnerability is added to a security vulnerability database, without the inevitable delay associated with having to wait until a manual risk assessment is made by an operations team responsible for managing the security of the application.

The security risk manager can be configured in certain embodiments such that the automatic response to finding a potentially relevant security vulnerability relating to a particular code entity is confined to a targeted disabling of those code entities contained in the application that use the vulnerable code entity. With such a selective and limited disabling of any vulnerable code entities, the application will in many cases be able to continue to run, albeit with reduced functionality, while at the same time removing the application's exposure to the security vulnerability.

The security risk manager can serve to protect an application against inherent vulnerabilities in the packages, components, libraries, microservices or other code entities that it calls, e.g. vulnerabilities that are the result of poor design, as such vulnerabilities are discovered and added to a security vulnerability database. The security risk manager can also serve to protect an application against a vulnerability that has been maliciously created by a hacker modifying a code entity, e.g. to incorporate a keystroke logger.

The security risk manager may further comprise a list of known security alerts, wherein said changing of an affected code entity to a disabled state is performed conditional on the security alert being absent from said list. In other words, an affected code entity is only changed to a disabled state after additionally checking that the security alert is not present in the list. The security alert's presence in the list signifies that the security alert can be ignored. The list is to be maintained by the operations team responsible for the application's security. For example, an entry will be made into the list after a security vulnerability notified in a security alert has been investigated by the operations team and deemed harmless. This may be because it did not in fact pose a risk to the application or because the operations team has undertaken some remedial action to modify the application.

Example code entities are components, packages, libraries and microservices.

The back-out behavior may for example comprise generating an error message.

Responsive to finding a relevant security alert, the security risk manager may be further operable to automatically send a notification of the security alert to an external security manager. The external security manager that receives security alert notifications for the operations team from the security risk manager may be a security monitoring tool or a user account in a messaging application. In addition to or instead of sending security alert notifications, the security risk manager may be configured to maintain a log of security alerts that it has determined are relevant for the application it is monitoring.

In some embodiments, the security alerts are provided with a multi-level severity grading. This is in particular an option when the security vulnerabilities database provides its security alerts with multiple severity levels, in which case the security risk manager can simply adopt the same severity levels and associate each severity level with a different response definition, thereby to provide a more graduated response to security alerts. The change of an affected code entity to a disabled state can then be performed differently depending on the severity level. There may be a maximum severity level which results in immediate change of an affected code entity into a disabled state. In addition, there may be one or more lesser severity levels which result in a delayed change of an affected code entity into a disabled state, e.g. after a certain threshold time which may correspond to a service level under which the operations team should investigate any security alerts. Furthermore, there may be a minimum severity level which suppresses the change of an affected code entity into a disabled state.

According to another aspect of the disclosure, there is provided a computer program stored on a computer readable medium and loadable into the internal memory of a computing device, comprising software code portions, when said program is run on a computing device, for performing the above-defined method. A computer program product may also be provided which stores the above-mentioned computer program.

Still yet, any of the components of the present invention could be deployed, managed, serviced, etc., by a service provider who offers to manage security vulnerabilities in a computer system.

Embodiments of the present invention also provide related systems, methods, and/or program products.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Illustrative embodiments will now be described more fully herein with reference to the accompanying drawings, in which illustrative embodiments are shown. It will be appreciated that this disclosure may be embodied in many different forms and should not be construed as limited to the illustrative embodiments set forth herein. Rather, these embodiments are provided so that this disclosure will be thorough and complete and will fully convey the scope of this disclosure to those skilled in the art.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. Furthermore, similar elements in different figures may be assigned similar element numbers. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing," "detecting," "determining," "evaluating," "receiving," or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission or viewing devices. The embodiments are not limited in this context.

As stated above, embodiments described herein provide for enabling a security risk manager embedded in an application to manage security vulnerabilities of the application. More specifically, the application comprises code entities such as components, packages, libraries or microservices. The code entities are modified as part of the application development process to have an enabled state, in which they are permitted to run normally when called, and a disabled state, in which the code entity does not run when called but instead performs a back-out behavior such as generating an error message. At runtime, the application periodically accesses a security vulnerabilities database to check for security alerts. When a relevant security alert is found, the application changes any code entities that are affected by the security alert to the disabled state pending investigation by an operations team. The application notifies the operations team by sending a notification of the security alert to an external security monitoring tool.

Figure 1:
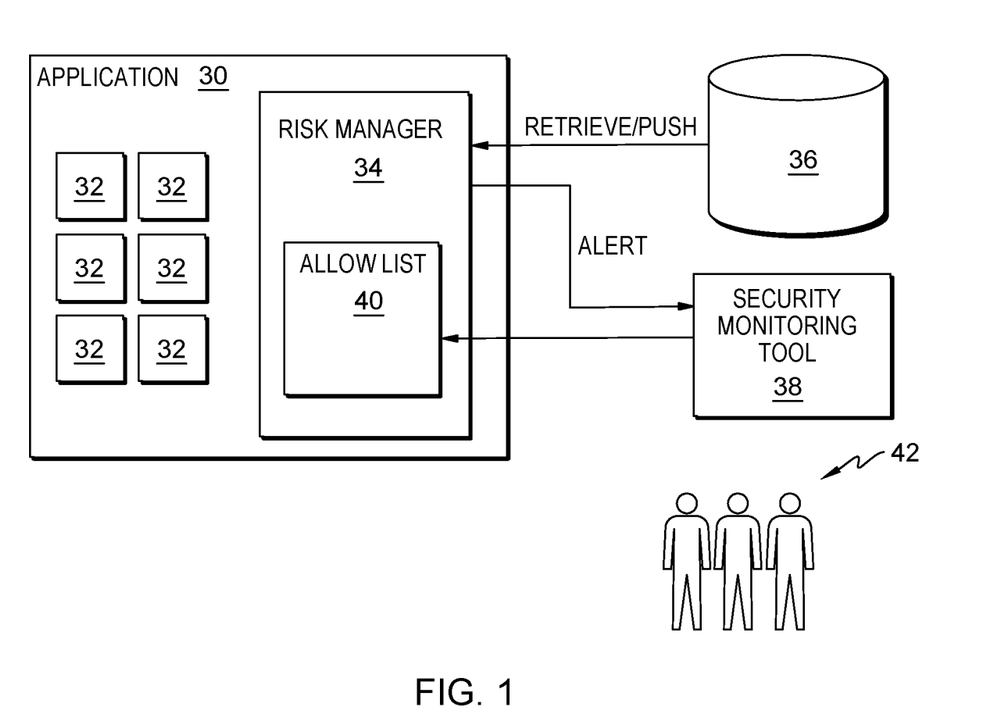
FIG. 1 is a schematic system drawing showing an application with an embedded security risk manager according to an embodiment of the disclosure.

FIG. 1 is a schematic system drawing showing an application 30, for example a web application, with an embedded security risk manager 34 according to an embodiment of the disclosure. The application has access to a security vulnerabilities database 36 via a suitable communications link. The access may be via a retrieve or push connection. In addition, a security monitoring tool 38 is provided via which an operations team 42 manages the application's security. The application 30 is composed of a plurality of code entities 32, such as libraries, components, packages or microservices. The code entities 32 are all shown schematically as being inside the application 30, but some or all may be outside the application 30, i.e. they may be external code entities that are called by the application 30. The security risk manager 34 is itself a code entity, such as a component, package or microservice. The security risk manager 34 is operable to refer to the security vulnerabilities database 36 at appropriate time intervals to check for security alerts. Responsive to detection of a security alert that is relevant to one or more code entities 32 of the application 30, the security risk manager 34 automatically disables the affected code entity and sends a security alert notification to the security monitoring tool 38. The security risk manager 34 may define only one universally applicable procedure for responding to a security alert, such as to disable the affected code entity immediately. A more graduated approach is possible when the security vulnerabilities database 36 classifies its security alerts with a multi-level severity factor. In that case, the security risk manager 34 can be designed to respond differently depending on the severity level. One example would be to have four severity levels: critical, high, moderate and low. The security risk manager can then be configured to intervene in a graduated manner as follows:

critical: operations team notified & code entity immediately disabled     high: operations team notified & code entity disabled when vulnerability is older than a first-time threshold, e.g. 7 days     moderate: operations team notified & code entity disabled when vulnerability is older than a second time threshold, e.g. 30 days     low: operations team notified & code entity not disabled With this graduated response, if the operations team does not act on a high-level or moderate-level security alert for above the specified threshold amount of time, then the code entity will be disabled. The above-stated time thresholds may be configurable by the operations team.

The operations team 42 may take remedial action by updating the affected code entity 32, i.e. replacing it with a new version that has been patched to remove the security vulnerability. After such an update, when the security risk manager 34 performs its next scan of the security vulnerabilities database 36 and finds the same security alert again, it will not take any action, since the security alert will not list the new version of the code entity 32.

Optionally, the security risk manager 34 further maintains a list 40 of known security alerts that can safely be ignored, which we refer to as the "allow list". Security alerts that can be safely ignored are those that have been investigated by the operations team 42 and have been dealt with. The operations team 42 can manage the allow list 40 via the security monitoring tool 38. Namely, the operations team 42 can use the security monitoring tool 38 to inspect and edit the allow list 40, in particular to remove a security alert from the allow list 40 after it has been dealt with. For example, the operations team may have investigated the security vulnerability described in the security alert and established that, although the vulnerable code entity is present in the application, it is not actually ever run by the application, or not in a way that causes the security vulnerability to have an effect. A back-end portion of the security risk manager 34 is configured to maintain the allow list 40. The back end is also responsible for issuing commands through a push or retrieve (i.e. pull) notification connection to instances of the application to disable and re-enable affected code entities as appropriate. A code entity will be automatically disabled by the security risk manager 34 when a security alert is detected and later re-enabled as a result of manual action by the operations team 42, e.g. to add the security alert to the allow list. In addition to or instead of sending security alert notifications, the security risk manager may be configured to maintain a log of security alerts that it has determined are relevant for the application it is monitoring. The log entry for a security alert may additionally list the one or more code entities affected by the security alert. The operations team can then maintain the log. Security alerts may be removed from the list as they are dealt with. Alternatively, when a security alert is added to the log it is given a 'pending' status and once it has been dealt with its status can be changed to 'dealt with'. In the latter case, the list will thus provide a historical record of all security alerts, including a timeline and by whom and how they were dealt with. The security risk manager 34 can also be configured to generate a report documenting the code entities of an application that are disabled responsive to a security alert, which may take the form of a log report in case that a security alert log is provided.

If desired, certain code entities 32 that are vital to the running of the application 30 could be blocked from being automatically disabled responsive to receipt of a security alert. However, such an approach is to be enjoyed with care, to avoid the risk of a catastrophic data breach whose consequences would be more severe than downtime of the application 30. For example, downtime of an application 30 would be preferable to a data breach that could result in all customer data accessible to the application being transmitted to a malicious server. In such cases, the security risk manager 34 could be configured to disable the notification client and thereby prevent the customer data from being sent to the malicious server.

Figure 2:
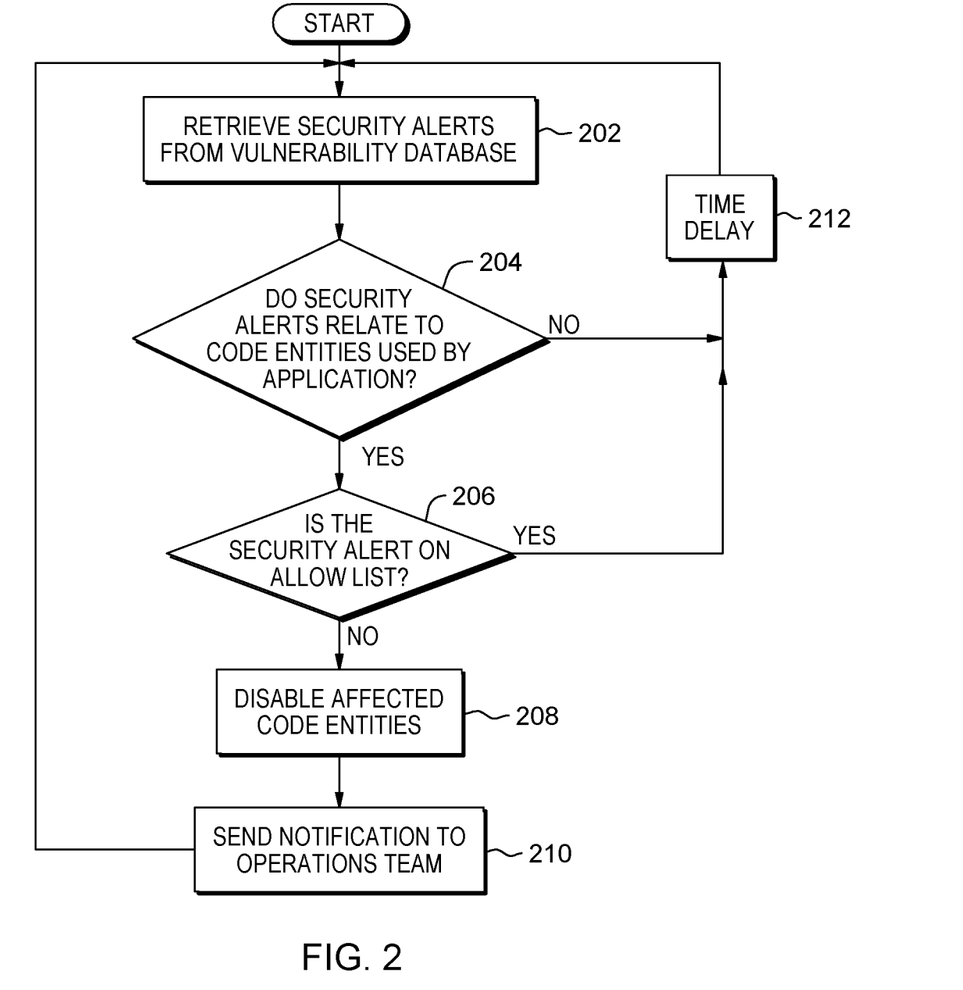
FIG. 2 is a flow chart showing runtime behavior of the system of FIG. 1 according to an embodiment of the disclosure.

FIG. 2 is a flow chart showing runtime behavior of the system of FIG. 1.

In 202, the security risk manager checks the security vulnerabilities database for security alerts, e.g. at fixed time gaps or in response to some external trigger that occurs from time to time at appropriate intervals. The checking mechanism may be implemented in front-end code to retrieve the latest list of vulnerable libraries, components, microservices or other code entity types from the security vulnerabilities database, e.g. the NIST NVD or a database maintained by a commercial provider. Alternatively, the checking mechanism could be implemented in back-end code which pushes the security alerts, or at least the ones that are relevant to the application, to the front-end code, e.g. through a web socket.

In 204, it is then checked whether any security alerts are relevant to code entities contained in the application.

If the outcome of the test of 204 is 'yes', then in 206 an additional test is made with reference to the allow list as to whether the security alert is present in the allow list. If that is the case, then the security alert is ignored.

If the outcome of the test of 206 is 'yes', then in 208 each entity of the application directly affected by the security alert is immediately disabled (or as described further above some other action in case of a non-critical level alert in a multi-level security alert classification). In 210, a notification is sent to the security monitoring tool to inform the operations team of the security alert. Alternatively, in the absence of a security monitoring tool, the notifications can be sent to a user account monitored by the operations team, or individual members thereof, through a generic messaging application such as email or a specialist messaging application used by IT management professionals such as PagerDuty (trademark).

If the outcome of the test in either 204 or 206 is 'no', then the flow waits an appropriate amount of time in 212, e.g. with a simple timer, before returning to 202 and once more checking the security vulnerabilities database for security alerts. A periodic checking of the security vulnerabilities database thus takes place at appropriate time intervals that can be defined by the operations team.

It is further noted that, after the operations team has processed a security alert and wishes to re-enable a disabled entity, this can be done manually by one of the operations team or using a function provided in the security monitoring tool by sending a code-entity-specific disable or enable command to the security risk manager.

The security risk manager thus provides a graduated approach to disabling and re-enabling components that allows the integrity of an application to be preserved as much as is reasonable, so the response to a security alert is proportional and the application will be able to continue to run with reduced functionality. Use of multiple severity levels with graduated responses can provide further gradations in the response. A granular degradation of the functionality of an application can thus be implemented with a degree of degradation that is in proportion to the extent to which a vulnerable code entity is used in the application and optionally also a severity level of the security alert in case of multi-level security alerts.

Nevertheless, when a security vulnerability is identified in a code entity that is key to a core function of the application, disabling that code entity will effectively render instances of the application inoperable. To cater for such situations, each code entity that is bundled in the application with a disable/enable toggle status can additionally be provided with a flag to indicate if the code entity is a key code entity. The security risk manager can then be configured to take the entire application offline in case a critical security alert is detected that is relevant for a key code entity. This prevents instances of the application being allowed to continue running when they are unable to fulfill a minimum service level.

Figure 3:
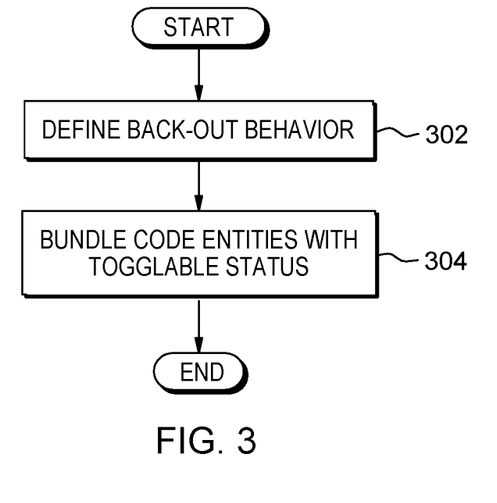
FIG. 3 is a flow chart showing steps taken at build time to embed the security risk manager into the application according to an embodiment of the disclosure.

FIG. 3 is a flow chart showing steps taken at build time to embed the security risk manager into the application as part of the application's development. The security risk manager is written so as to define what action to take at runtime when a security alert is received that informs of a vulnerability in a code entity contained in or called by the application. The action is taken at an appropriate code entity type within the application as may be conveniently defined according to how the application is written. Concrete examples of code entity types that could be subject to selective disabling by the security risk manager are component, library and microservice.

In 302, the security risk manager is configured to define how each code entity behaves when it is disabled, i.e. what action it takes when the disabled code entity is called at runtime, which we refer to as its back-out behavior. A simple back-out behavior would be to replace the disabled code entity with an empty shell code entity containing an error message such as: "Library unavailable". The security risk manager permits the code entity state to be toggled between a disabled state and an enabled state. The back-out behavior is defined for each code entity.

In 304, the code entities are bundled into an application such that the back-out behavior for each code entity, as defined in 302, is added for each code entity.

We now describe an example implementation of a security risk manager embedded in a front-end application in order to check for and react to relevant security alerts relating to front-end components within the application that are subject to a security alert on a security vulnerabilities database. The example is described with reference to an application written using React, which is a JavaScript library for building user interfaces. A front-end application of this type will typically use many third-party libraries. For example, one common library provides a user interface for managing entries typed into text fields. In this theoretical example, we label the library "react-field-helper". Many different components of the front-end application may call "react-field-helper".

Let us consider the following scenario. The application was put into production using a specific version of "react-field-helper". At some later point in time, it is discovered that the version of the library used in the application contains a security vulnerability maliciously created by a hacker. The hacker broke into the account of one of the library maintainers and modified the coding of "react-field-helper" to incorporate a keystroke logger. The hacked version thus still performs its normal functions but additionally captures user keystrokes and sends them to an external site. This scenario is in fact a précis of an actual incident in 2018 as described at: https://eslint.org/blog/2018/07/postmortem-for-malicious-package-publishes. In this incident, an attacker compromised the NPM account of an ESLint maintainer and published malicious versions of the ESLint-scope and ESLint-config-ESLint packages to the NPM registry. On installation, the malicious packages downloaded and executed code from pastebin.com which sent the contents of a user's .npmrc file to the attacker.

The security risk manager of the present disclosure would behave as follows in such a scenario. The security risk manager would query a security vulnerabilities database at appropriate time intervals and then be alerted to the security vulnerability relating to the "react-field-helper" library used by the application once it has been added as a security alert to the security vulnerabilities database.

In response to detecting the security alert, the security risk manager acts to disable the "react-field-helper" library. A subsequent call to the library from a component of the application will then be replaced with an empty component which contains a general error message such as: "Component unavailable". The React library has the concept of "error boundaries" where errors are caught and contained within a certain level of an application. The security risk manager can incorporate a similar concept of "security boundaries", whereby the component using the vulnerable library is caused to throw an error, which is then caught at some level of the application, thereby disabling only the affected part of the application, rather than the entire application.

We now describe an example implementation of a security risk manager embedded in a web application in order to check for and react to relevant security alerts relating to front-end components within the application. The example is described with reference to the JavaScript environment and the NPM security vulnerabilities database owned by GitHub. Security vulnerabilities for NPM packages are published on this database at https://www.npmjs.com/advisories. An API is available to query these security alerts. There are four severity levels for NPM security alerts: critical, high, moderate and low, which can be dealt with as described further above by configuring the security risk manager to intervene differently depending on the severity level, only immediately disabling the component when the alert level is critical.

The back end of the security risk manager is operable to query the security vulnerabilities database at appropriate time intervals. The query determines whether there are any security alerts relating to components used in the application being monitored. Each time the security risk manager detects a relevant security alert, the back end sends a notification to the security monitoring tool, or directly to the operations team, informing of the security alert. These notifications will include information on the severity level of the security alert, e.g. critical, high, moderate or low alert levels. The back end can also maintain a push notification connection, e.g. a web socket connection, to each front-end instance of the application, e.g. a browser instance of a web browser application. The web socket connection is used by the security risk manager to issue commands to the front-end instances so that individual components can be automatically disabled responsive to receipt of a security alert. The same connection may also be used to allow the component status to be toggled back to enabled after the security alert has been dealt with by the operations team, e.g. responsive to a security alert being added to the allow list. When the back-end scans the security vulnerabilities database and finds a critical-level security alert for a component that is used by the application, the security risk manager uses the push notification connection to instruct the front-end instance immediately to disable that component. The front-end instance toggles the affected component to disabled, so that any subsequent attempts to access it results in an error being generated, which in turn triggers a security boundary to display a suitable error message to the user, e.g. "Sorry, not available". At the same time, the back end issues a notification to the operations team, so that the operations team knows to investigate the security alert. If, after reviewing the security alert, the operations team determines that the security alert does not in fact impact the application (for example, the security vulnerability is in a function of the component that the application does not use), then the operations team can add the security alert to the allow list, so that the security risk manager knows to ignore this specific security alert if it is encountered again. The backend is configured to issue commands through the push notification connection to the front-end instances to enable any components that are in a disabled state as a result of an security alert that is now on the allow list.

The same approaches as described above can also be used in a microservices architecture. A microservice architecture is one that decomposes an application into a set of small inter-operating applications, these small applications being the microservices. In a microservices implementation of the security risk manager, the microservices are the code entities. The security risk manager is configured to disable and enable individual microservices, i.e. toggle them off and on, responsive respectively to receiving and dealing with security alerts. The security risk manager permits the microservice-based application to continue running, but with reduced functionality owing to certain microservices having been disabled. As in the previous examples, the security risk manager can selectively disable individual microservices responsive to detection of a relevant security alert.

It will be clear to one of ordinary skill in the art that all or part of the logical process steps of the preferred embodiment may be alternatively embodied in a logic apparatus, or a plurality of logic apparatus, comprising logic elements arranged to perform the logical process steps of the method and that such logic elements may comprise hardware components, firmware components or a combination thereof.

It will be equally clear to one of skill in the art that all or part of the logic components of the preferred embodiment may be alternatively embodied in logic apparatus comprising logic elements to perform the steps of the method, and that such logic elements may comprise components such as logic gates in, for example, a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further alternative embodiment, the present invention may be realized in the form of a computer implemented method of deploying a service comprising steps of deploying computer program operable to, when deployed into a computer infrastructure and executed thereon, cause the computing device to perform all the steps of the method.

It will be appreciated that the method and components of the preferred embodiment may alternatively be embodied fully or partially in a parallel computing system comprising two or more processors for executing parallel software.

A further embodiment of the invention is a computer program product defined in terms of a system and method. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It is to be understood that although this disclosure includes a detailed description on cloud computing, implementation of the teachings recited herein are not limited to a cloud computer system. Rather, embodiments of the present invention are capable of being implemented in conjunction with any other type of computer system now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computer system is service oriented with a focus on statelessness, low coupling, modularity, and semantic interoperability. At the heart of cloud computing is an infrastructure that includes a network of interconnected nodes.

Figure 4:
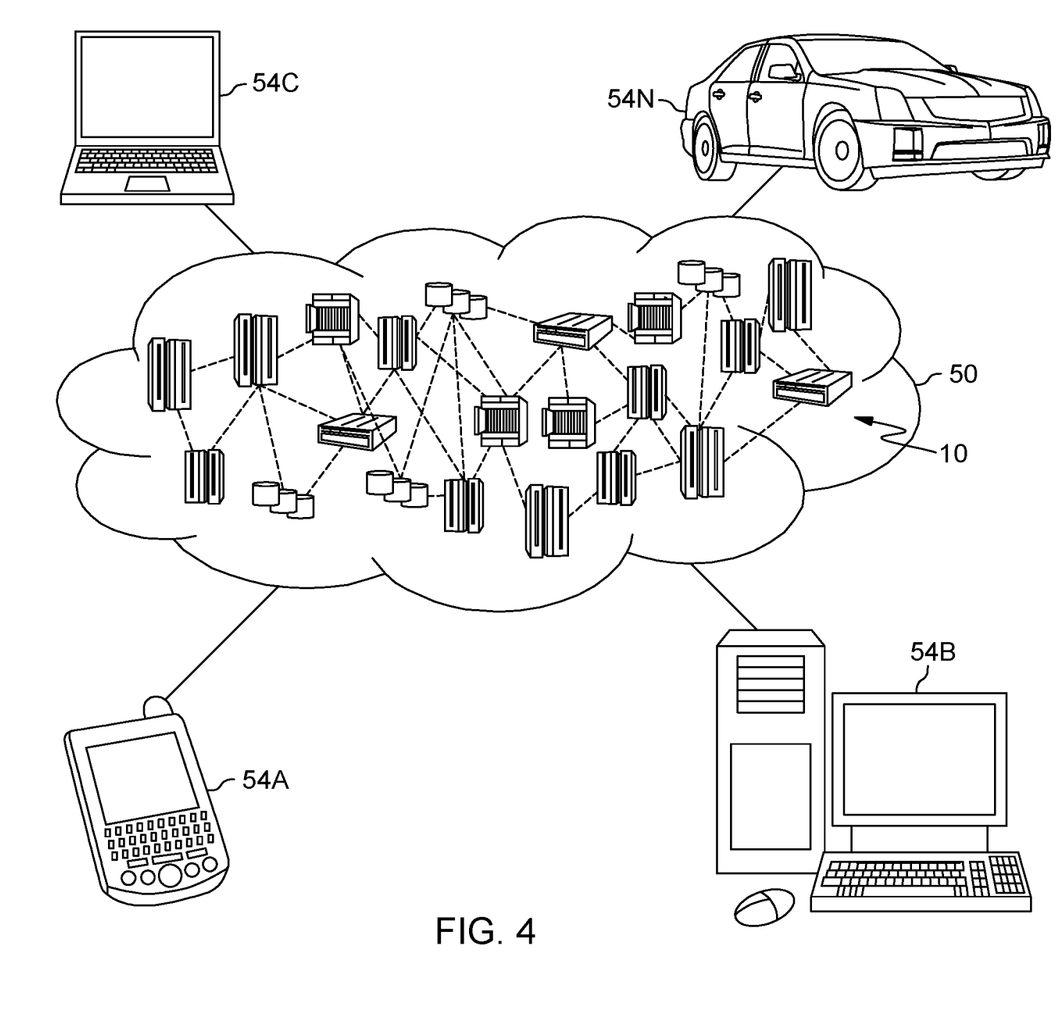
FIG. 4 depicts a cloud computer system according to an embodiment of the disclosure.

Referring now to FIG. 4, illustrative cloud computer system 50 is depicted. As shown, cloud computer system 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computer system 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computer system 50 can communicate with any type of computerized device over any type of network and/or network addressable connection (e.g., using a web browser).

Figure 5:
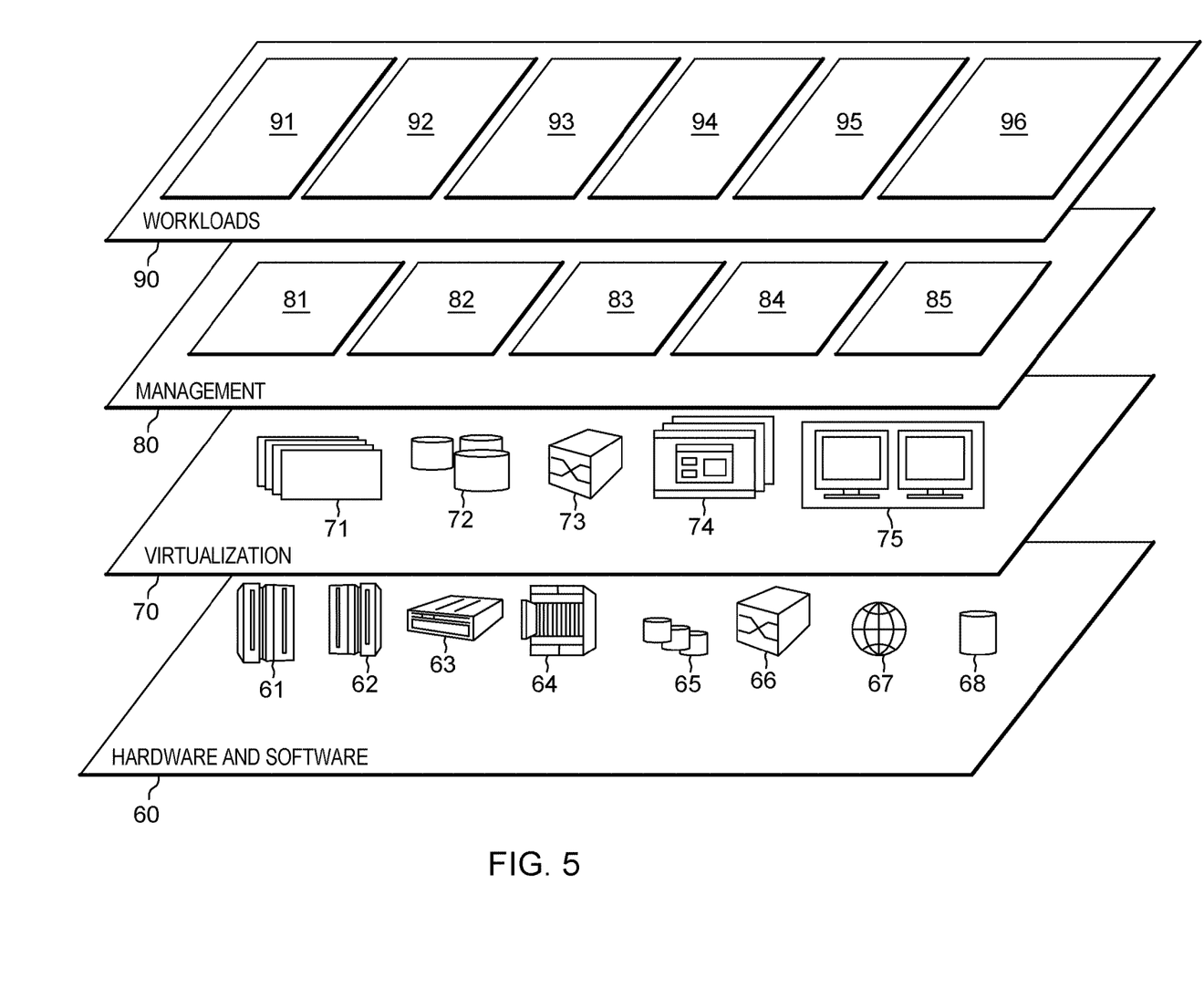
FIG. 5 depicts abstraction model layers according to an embodiment of the disclosure.

Referring now to FIG. 5, a set of functional abstraction layers provided by cloud computer system 50 (FIG. 4) is shown. It should be understood in advance that the components, layers, and functions shown in FIG. 5 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computer system. Metering and Pricing 82 provide cost tracking as resources are utilized within the cloud computer system, and billing or invoicing for consumption of these resources. In one example, these resources may include application software licenses. Security provides identity verification for cloud consumers and tasks, as well as protection for data and other resources. User portal 83 provides access to the cloud computer system for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computer system may be utilized. Examples of workloads and functions which may be provided from this layer include: mapping and navigation 91; software lifecycle management 92; virtual classroom education delivery 93; data analytics processing 94; transaction processing 95; and security risk manager 96 (shown as 34 in FIG. 1) according to embodiments of the disclosure.

It will be clear to one skilled in the art that many improvements and modifications can be made to the foregoing exemplary embodiment without departing from the scope of the present disclosure.

What is claimed is:

1. A computer-implemented method for managing security vulnerabilities in a computer application, the method comprising:
providing each of a plurality of code entities of an application with an enabled state in which a code entity is permitted to run responsive to being called and a disabled state in which the code entity is prevented from being run responsive to being called and instead performs a back-out behavior; and
providing the application with a security risk manager operable to:
query a security vulnerabilities database for security alerts relevant to the plurality of code entities;
responsive to detecting a relevant security alert, identifying one or more affected code entities of the plurality of code entities which are affected by the detected relevant security alert;
determining a severity of the detected relevant security alert and a corresponding disablement time threshold according to which the one or more affected code entities are to be disabled; and
automatically change the identified one or more affected code entities of the plurality of code entities to the disabled state responsive to the detected security alert being older than an age indicated by the corresponding disablement time threshold.

2. The computer-implemented method of claim 1, the security risk manager further comprising a list of known security alerts, wherein the changing of an affected code entity to a disabled state is performed responsive to determining that the relevant security alert is absent from the list.

3. The computer-implemented method of claim 1, wherein the back-out behavior comprises generating an error message.

4. The computer-implemented method of claim 1, wherein, responsive to finding the relevant security alert, the security risk manager is further operable to automatically send a notification of the relevant security alert to an external security manager.

5. The computer-implemented method of claim 4, wherein the external security manager is one of a security monitoring tool, and a user account in a messaging application.

6. The computer-implemented method of claim 1, the security risk manager further comprising a log of security alerts that have yet to be dealt with, wherein, responsive to finding the relevant security alert, the security risk manager is operable to add the relevant security alert to the log.

7. The computer-implemented method of claim 1, wherein there exists a maximum severity level which results in immediate change of an affected code entity into a disabled state and at least one lesser severity level which results in delayed change of an affected code entity into a disabled state.

8. The computer-implemented method of claim 7, wherein the at least one lesser severity level includes a minimum severity level which suppresses said changing of an affected code entity into a disabled state.

9. The computer-implemented method of claim 1, wherein said plurality of code entities are at least one of: components, packages, libraries and microservices.

10. A computer system for managing security vulnerabilities in a computer application, the computer system comprising:
a memory medium comprising program instructions;
a bus coupled to the memory medium; and
a processor, for executing the program instructions, that when executing the program instructions causes the system to:
provide each of a plurality of code entities of an application with an enabled state in which a code entity is permitted to run responsive to being called and a disabled state in which the code entity is prevented from being run responsive to being called and instead performs a back-out behavior; and
provide the application with a security risk manager operable to:
query a security vulnerabilities database for security alerts relevant to the plurality of code entities;
responsive to detecting a relevant security alert, identify one or more affected code entities of the plurality of code entities which are affected by the detected relevant security alert;
determine a severity of the detected relevant security alert and a corresponding disablement time threshold according to which the one or more affected code entities are to be disabled; and
automatically change the identified one or more affected code entities of the plurality of code entities to the disabled state responsive to the detected security alert being older than an age indicated by the corresponding disablement time threshold.

11. The computer system of claim 10, the security risk manager further comprising a list of known security alerts, wherein the changing of an affected code entity to a disabled state is performed responsive to determining that the relevant security alert is absent from the list.

12. The computer system of claim 10, wherein the back-out behavior comprises generating an error message.

13. The computer system of claim 10, wherein, responsive to finding the relevant security alert, the security risk manager is further operable to automatically send a notification of the relevant security alert to an external security manager.

14. The computer system of claim 13, wherein the external security manager is one of a security monitoring tool, and a user account in a messaging application.

15. The computer system of claim 10, the security risk manager further comprising a log of security alerts that have yet to be dealt with, wherein, responsive to finding the relevant security alert, the security risk manager is operable to add the relevant security alert to the log.

16. A computer program product for managing security vulnerabilities in a computer application, the computer program product comprising a computer readable hardware storage device, and program instructions stored on the computer readable hardware storage device, to:
provide each of a plurality of code entities of an application with an enabled state in which a code entity is permitted to run responsive to being called and a disabled state in which the code entity is prevented from being run responsive to being called and instead performs a back-out behavior; and
provide the application with a security risk manager operable to:
query a security vulnerabilities database for security alerts relevant to the plurality of code entities;
responsive to detecting a relevant security alert, identify one or more affected code entities of the plurality of code entities which are affected by the detected relevant security alert;
determine a severity of the detected relevant security alert and a corresponding disablement time threshold according to which any the one or more affected code entities are to be disabled; and
automatically change the identified one or more affected code entities of the plurality of code entities to the disabled state responsive to the detected security alert being older than an age indicated by the corresponding disablement time threshold.

17. The computer program product of claim 16, the security risk manager further comprising a list of known security alerts, wherein the changing of an affected code entity to a disabled state is performed responsive to determining that the relevant security alert is absent from the list.

18. The computer program product of claim 16, wherein the back-out behavior comprises generating an error message.

19. The computer program product of claim 16, wherein, responsive to finding the relevant security alert, the security risk manager is further operable to automatically send a notification of the relevant security alert to an external security manager.

20. The computer program product of claim 19, wherein the external security manager is one of a security monitoring tool, and a user account in a messaging application.

* * * * *